United States Patent
Zucker

(10) Patent No.: US 6,689,509 B2
(45) Date of Patent: Feb. 10, 2004

(54) LAMINATED MULTILAYER SEPARATOR FOR LEAD-ACID BATTERIES

(75) Inventor: Jerry Zucker, Charleston, SC (US)

(73) Assignee: Daramic, Inc., North Charleston, SC (US)

( * ) Notice: Subject to any disclaimer, the term of this patent is extended or adjusted under 35 U.S.C. 154(b) by 0 days.

(21) Appl. No.: 10/076,229

(22) Filed: Feb. 14, 2002

(65) Prior Publication Data

US 2003/0054237 A1 Mar. 20, 2003

Related U.S. Application Data

(63) Continuation-in-part of application No. 09/957,622, filed on Sep. 20, 2001, now abandoned.

(51) Int. Cl.[7] .............................. H01M 2/18; H01M 2/16
(52) U.S. Cl. ........................................ 429/145; 429/254
(58) Field of Search ................................ 429/144, 145, 429/225, 247, 249, 254; 428/297.1, 316.6

(56) References Cited

U.S. PATENT DOCUMENTS

| | | | |
|---|---|---|---|
| 3,558,764 A | 1/1971 | Isaaeson et al. ............ 264/210 |
| 3,669,746 A | 6/1972 | Devitt et al. ................. 136/30 |
| 3,679,538 A | 7/1972 | Druin et al. ................. 161/159 |
| 3,801,404 A | 4/1974 | Druin et al. ................. 156/229 |
| 3,839,240 A | 10/1974 | Zimmerman .......... 260/2.5 HA |
| 3,843,761 A | 10/1974 | Bierenbaum et al. ... 264/210 R |
| 4,448,862 A | 5/1984 | Schulte et al. .............. 429/136 |
| 4,620,956 A | 11/1986 | Hamer ....................... 264/145 |
| 4,731,304 A | 3/1988 | Lundquist et al. ............ 429/62 |
| 4,743,520 A | * 5/1988 | Rosansky .................... 429/94 |
| 4,908,282 A | 3/1990 | Badger ........................ 429/59 |
| 5,075,183 A | 12/1991 | Yamaguchi et al. ......... 429/139 |
| 5,376,477 A | * 12/1994 | Aidman et al. ............. 429/141 |
| 5,470,676 A | 11/1995 | Nakano ....................... 429/139 |
| 5,902,696 A | * 5/1999 | Smesko et al. ............. 429/142 |
| 5,922,492 A | * 7/1999 | Takita et al. ................ 429/249 |
| 5,962,161 A | 10/1999 | Zucker ........................ 429/142 |
| 6,124,059 A | 9/2000 | Bohnstedt .................... 429/252 |
| 6,511,774 B1 | * 1/2003 | Tsukuda et al. ............. 429/247 |

FOREIGN PATENT DOCUMENTS

EP      0 811 479      12/1997

OTHER PUBLICATIONS

Patent Abstracts of Japan for JP 10–12211 A (publication date of Jan. 16, 1998).*
"All you ever really wanted to know about separators"; Bob Nelson; Apr. 2000; VRLA Technology; 7–Pages.
"New developments in Polyethylene separators"; Entek International; Sep. 19–22, 2000; (DuraGard) 9–Pages.
"Handbook of Battery Materials"; Jurgen O. Besenhard (Ed.); pp.: 245–292, 1999 No month.
Journal of Power Sources 78 (1999) 35–40; W. Bohnstedt; "New developments in separators for valve–regulated lead–acid batteries" (No month).
Journal of Power Sources 53 (1995) 283–287; Syng L. Paik et al.; "Rubber separators for tomorrow: performance characteristics and selection guide" (No month).
Copy of the International Search Report dated Mar. 26, 2003 for PCT/IB02/05060.

* cited by examiner

Primary Examiner—Susy Tsang-Foster
(74) Attorney, Agent, or Firm—Nields & Lemack

(57) ABSTRACT

The invention concerns a battery separator comprising at least one microporous polymer layer and at least one fibrous layer, wherein the microporous polymer layer comprises micropores with an average pore size of less than 1 μm and a number of holes with a diameter which is greater than the average diameter of the pores of the fibrous layer.

35 Claims, 1 Drawing Sheet

LAMINATED MULTILAYER SEPARATOR FOR LEAD-ACID BATTERIES

This Application is a Continuation-In-Part of U.S. patent application Ser. No. 09/957,622 filed on Sep. 20, 2001, now abandoned.

FIELD OF THE INVENTION

This invention relates to novel porous separators for electric lead-acid storage batteries. According to another aspect the invention relates to lead-acid storage batteries comprising such a novel separator.

BACKGROUND OF THE INVENTION

Basically, battery separators serve as electronic insulators and ionic conductors, i.e. they prevent the direct electronic contact of electrodes of opposite polarity while enabling the ionic current between them. To meet these two functions, separators are usually porous insulators with pores as small as possible to prevent electronic short circuits by dendrites or plate particles and with a porosity as high as possible to minimize the internal battery resistance. In lead-acid batteries, the separator also determines the proper plate spacing and thereby defines the amount of electrolyte which participates in the cell reaction. The separator has to be stable over the life time of the battery, i.e. to withstand the highly aggressive electrolyte and oxidative environment.

Beyond these basically passive functions, separators in lead-acid batteries can also actively affect the battery performance in many ways. In valve regulated lead-acid (VRLA) batteries they additionally determine properties like oxygen transfer, electrolyte distribution and plate expansion. Due to their outstanding influence on the performance of VRLA batteries the separator is even referred to as the "third electrode" or "fourth active material" (Nelson B., Batteries International, April 2000, 51–60).

VRLA stands for valve-regulated lead-acid batteries which are also called sealed or recombinant batteries. In VRLA batteries oxygen, which is generated during charging at the positive electrode, is reduced at the negative electrode. Thus the battery can be charged and even be overcharged without water consumption and is therefore theoretically maintenance-free. The formation of hydrogen at the negative electrode is suppressed, for instance by using larger negative than positive plates in order to generate oxygen at the positive plate before the negative plate is fully charged.

For VRLA batteries two technologies are predominant, i.e. batteries with an absorptive glassmat (AGM) and gel batteries. In batteries with AGM, the absorptive glassmat immobilizes the electrolyte and simultaneously functions as a separator. In gel batteries, the acid is immobilized by means of fumed silica and an additional separator is required to fix the plate distance and to prevent electronic shorts. Compared to AGM batteries, the manufacturing cost of gel batteries is considered to be higher and their specific power is lower due to a higher internal resistance.

In AGM batteries the electrolyte is completely absorbed by the glass mat. AGM separators have a very high porosity in excess of 90%. This high porosity together with a good wettability is reflected in a very high acid absorption and low electrical resistance. In the battery, the acid saturation of AGM separators is usually in a range of 85 to 95%. This increases the effective electrical resistance versus fully saturated separators but creates open channels of relatively large pores that enable a very efficient oxygen transfer from the positive to the negative plate. The average pore size of AGM separators is usually within the range of 3 to 15 $\mu$m with an anisotropic distribution, i.e. pore sizes of about 0.5 to 5 $\mu$m in the x-y-plane of the separator which is the plane parallel to the electrode plates and pore sizes of about 10 to 25 $\mu$m in the z-direction perpendicular to the electrodes. A potential drawback of the high oxygen transfer rate is the so-called thermal runaway, caused by the self-propelling exothermic consumption of oxygen at the negative plate and a premature capacity loss by undercharging of the negative plate.

Due to the relatively large pores and the good wettability, the wicking rate (speed of acid pick-up) of AGM is fairly high which facilitates the filling process of batteries.

A severe disadvantage of AGM separators is their mechanical weakness which is due to the fact that pure glass separators do not contain binders of any type. The tensile strength of this material depends only on the fiber contacts and some entanglement. At the molecular level these contacts are believed to be of the hydrogen bonding type established between adjacent fibers. Since finer fibers have greater chances to establish these contacts, it follows that the strength of the material is greatly influenced by their presence.

On the other hand coarser glass fibers also play a role in the ability of the AGM separators to serve its many functions. For instance, they improve the wicking rate by creating larger pores.

In an approach to benefit from both the advantages of fine and coarse glass fibers, multi-layered AGM separators have been proposed. It could be shown that two layers with fine and coarse fibers showed e.g. a better tensile strength as if these fibers would have been dispersed in one sheet (Ferreira A. L.; The Multilayered Approach for AGM Separators; 6$^{th}$ ELBC, Prague Czech Republic, September 1998).

U.S. Pat. No. 5,962,161 discloses separators made from a mat of meltblown ultrafine polymer fibers which may be reinforced with one ore more thin layers of spunbond fabric.

U.S. Pat. No. 4,908,282 discloses fibrous sheet separators comprising a mixture of glass fibers and polyethylene fibers.

It also has been suggested to include thin microporous sheets as part of the separator system in order to control dendrite formation and oxygen transfer to the negative plate. An example of such a microporous separator is the DuraGard™ separator introduced by ENTEX International LLC (Weighall M. J.; ALABC Project R/S—001, October 2000). DuraGard™ has an average pore size of 0.014 $\mu$m and a membrane thickness of 0.10 mm (Fraser-Bell G., New developments in Polyethylene separators, Presentation at the 7$^{th}$ European Lead Battery Conference, Sep. 19–22, 2000, Dublin, Ireland).

However, if the separator has a very small pore size, it will act as a barrier to oxygen transport, and the gas will rise to the top of the plates and go over the top or around the sides of the barrier layer of the separator. This means that only the top and edges of the negative plate will participate in the oxygen reduction reaction. This is not a desirable situation as the oxidation of the pure lead in the negative plates is a highly exothermic reaction, resulting in a build up of heat in a very localised area. This results in increased danger of premature water loss and deactivation of the negative plates. It was therefore suggested to use a separator with a larger average pore size, for example a microporous PVC separator having a mean pore size of 5 $\mu$m and a thickness of 0.57 mm, sandwiched between two layers of AGM with a thickness of 0.52 mm at 10 kPa (Weighall M. J., see above, Lambert U., A study of the effects of compressive forces applied onto the plate stack on cyclability of AGM VRLA batteries, 5$^{th}$ ALABC Members and Contractors' Conference Proceedings, Nice, France, Mar. 28–31, 2000). Although this separator configuration might provide for acceptable oxygen transfer and improved resistance to dendrite growth when compared to AGM separators, the risk of shorting is still existing. Moreover, due to the outer AGM layers these separators are difficult to form into pockets.

SUMMARY OF THE INVENTION

The present invention relates to a battery separator for a lead-acid battery comprising at least one microporous polymer layer and at least one fibrous layer, wherein said microporous polymer layer comprises micropores with an average pore size of less than 1 μm and a number of holes with a diameter which is greater than the average diameter of the pores of the fibrous layer.

It is the object of the invention to provide a battery separator for a lead-acid battery with improved tensile strength without impairing the oxygen transfer.

It is a further object of the invention to provide a battery separator which can be produced in a cost effective manner.

It is still a further object of the invention to provide an improved valve-regulated lead-acid battery with high cycling performance.

DETAILED DESCRIPTION OF THE INVENTION

Figure 1:
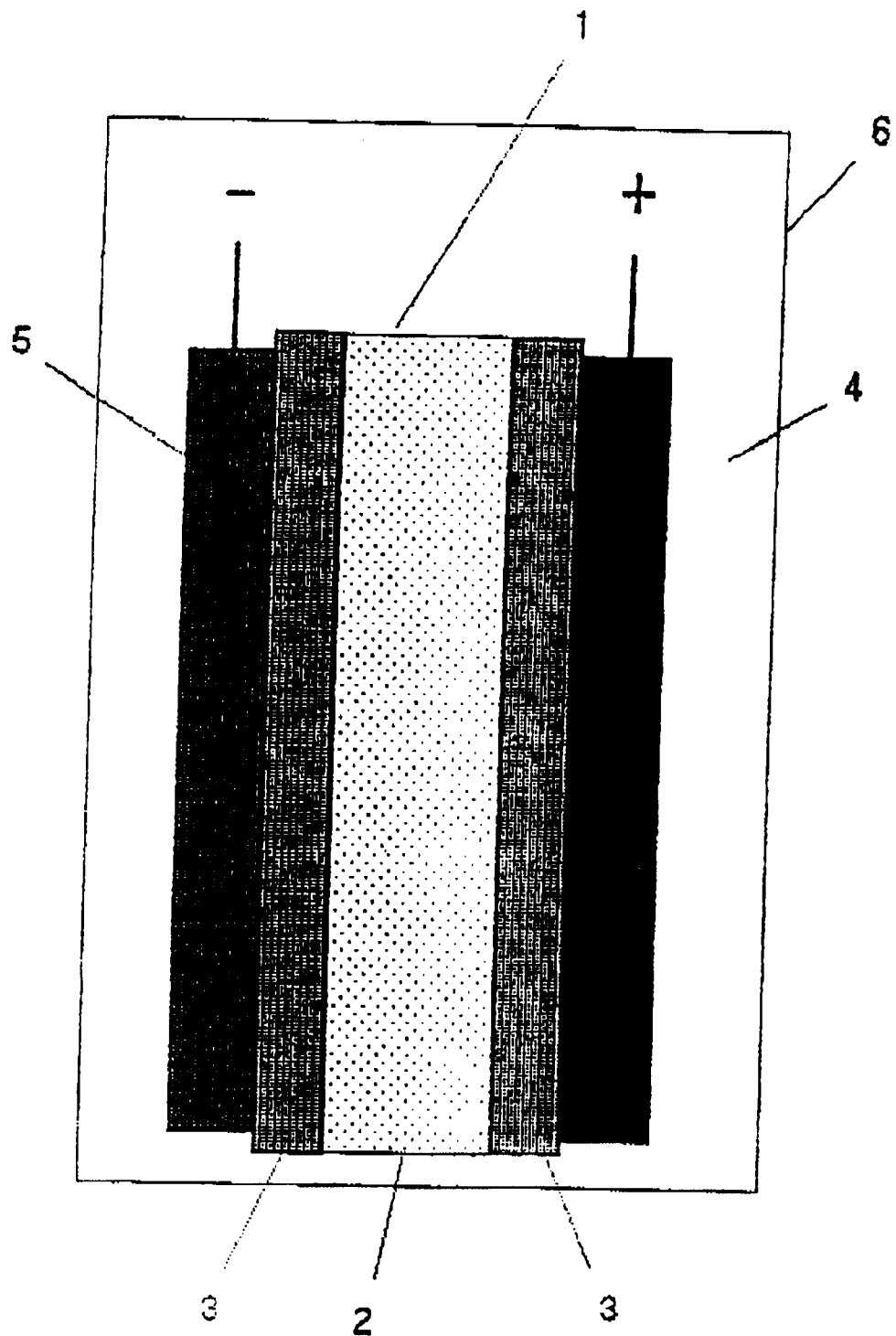
FIG. 1 is a schematic cut through a battery according to the invention.

The present invention is based on the surprising finding that separators with improved tensile strength can be manufactured without impairing the oxygen transfer within a VRLA battery by combining at least one fibrous layer with at least one microporous polymer layer comprising micropores with an average pore size of less than 1 μm wherein said microporous layer also comprises a number of holes with a diameter which is greater than the average diameter of the pores of the fibrous layer.

Unless otherwise stated, the pore size of the fibrous and microporous polymer layers is measured using the mercury intrusion method described in Ritter, H. L., and Drake, L. C., Ind. Eng. Chem. Anal. Ed., 17, 787 (1945). According to this method, mercury is forced into different sized pores by varying the pressure exerted on the mercury by means of a porosimeter (porosimeter model 2000, Carlo Erba). The pore distribution is determined by evaluation of the crude data with the MILESTONE 200 software. The pore size of the micropores of the polymer layer is measured before forming the holes.

The average pore size is defined as the pore size at which 50% of the total pore volume as determined by the mercury intrusion method is contained in smaller pores and 50% in larger pores.

According to a preferred embodiment the separator of the invention comprises at least two microporous polymer layers and each fibrous layer is sandwiched between two microporous polymer layers. According to a more preferred embodiment the separator comprises two microporous polymer layers and one fibrous layer. Separators with two outer polymer layers are advantageous in that they can be easily formed into pockets. It was found that use of microporous polymer layers with a certain number of holes ensures an efficient oxygen cycle without negative plate failure and without restricting the oxygen reduction reaction to the edges of the negative electrode plate.

In the following, embodiments of the present invention will be described in detail with reference to the accompanying drawing. FIG. 1 shows a separator 1 of the present invention. The separator comprises a fibrous layer 2 and two microporous polymer layers 3 and 3'. Also shown are the positive electrode 4 and the negative electrode 5 of the battery. The electrodes 4 and 5 as well as the separator 1 are contained in a closed case 6.

The microporous polymer layer 3 and the optional microporous polymer layer 3' are preferably made of a synthetic resin such as polyolefin, poly(vinyl chloride) or other suitable material which is compatible with the battery environment where it is to be used. The preferred separator material is polyolefin, such as polypropylene, ethylene-butene copolymer, and preferably polyethylene, more preferably high molecular weight polyethylene, i.e. polyethylene having a molecular weight of at least 600,000, even more preferably ultra high molecular weight polyethylene, i.e. polyethylene having a molecular weight of at least 1,000,000, in particular more than 4,000,000, and most preferably 5,000,000 to 8,000,000 (measured by viscosimetry and calculated by Margolie's equation), a standard load melt index of substantially 0 (measured as specified in ASTM D 1238 (Condition E) using a standard load of 2,160 g) and a viscosity number of not less than 600 ml/g, preferably not less than 1,000 ml/g, more preferably not less than 2,000 ml/g, and most preferably not less than 3,000 ml/g (determined in a solution of 0.02 g of polyolefin in 100 g of decalin at 130° C.).

The microporous polymer layer(s) preferably comprise a homogeneous mixture of 8 to 100 vol. % of polyolefin, 0 to 40 vol. % of a plasticizer and 0 to 92 vol. % of inert filler material. The preferred filler is dry, finely divided silica. The preferred plasticizer is petroleum oil. Since the plasticizer is the component which is easiest to remove from the polymer-filler-plasticizer composition, it is useful in imparting porosity to the battery separator. The final composition of the separator will depend upon the original composition and the component or components extracted. Materials of this kind are well-known in the art and described for example in U.S. Pat. No. 3,351,495, the disclosure of which is incorporated herein by reference.

The microporous polymer layer may also be formed of an essentially homogeneous mixture of at least one thermoplastic polymer, preferably ultra-high-molecular-weight (UHMW) polyolefin with an weight-average molecular weight of at least 600,000, at least 20% by volume of pyrogenic silica and optionally one ore more further fillers, preferably precipitated silica, so that the overall filler content is within the range of 60 to 82% by volume, and optionally a plasticizer, preferably a water-insoluble oil and/or process oil. Microporous polymer layers of this type are disclosed in U.S. Pat. No. 6,124,059, the disclosure of which is incorporated herein by reference.

Other preferred materials for the microporous polymer layer are microporous polyethylene films produced by (a) melt extruding at a drawdown ratio of about 20:1 to about 200:1 a polyethylene resin having a density of at least approximately 0.960 g/cm³ and having at least 99% weight ethylene to form an extruded precursor film, (b) annealing said extruded precursor film at a temperature in the range from about 10° C. to 25° C. less than the crystalline melting point of said resin so as to improve the crystallinity of the extruded precursor film and so as to form an unstretched annealed precursor film; (c) uniaxially cold stretching said annealed precursor film at a temperature in the range of from about −20° C. to about 70° C., and at a cold stretching rate of at least 75 percent per minute, based on the length of the unstretched annealed precursor film, to achieve a cold stretched length of from about 120 percent to about 160 percent, said cold stretched length being based on the length of said unstretched annealed precursor film, to form a cold stretched precursor film; (d) hot stretching said cold stretched precursor film, in the same uniaxial direction as said cold stretching, at a temperature in the range of from above the temperature in (c) to a temperature in the range of from about 10° C. to about 25° C. less than the crystalline melting point of the resin so as to maintain the crystallinity of the cold stretched precursor film, and at a hot stretching rate of less than 75 percent per minute, based on the length of said unstretched annealed precursor film, to achieve a hot stretched length of from about 235 percent to about 310 percent, said hot stretched length being based on the length of said unstretched annealed precursor film, so as to form a microporous polyethylene film. Films of this type are described in U.S. Pat. No. 4,620,956, the disclosure of which is incorporated herein by reference.

Also useful as microporous polymer layer are open-celled microporous polymer films obtained by uniaxially cold stretching a non-porous, crystalline, elastic film at a temperature in the range of between about −20° C. and a temperature 20° C. below the crystalline melting point of the polymeric film; and sequentially hot stretching in the same direction the cold stretched film in a plurality of discrete stretching steps at a temperature in the range of between about 20° C. below the crystalline melting point and 5° C. below the crystalline melting point. Films of this type are described in U.S. Pat. No. 3,843,761 the disclosure of which is incorporated herein by reference.

Further useful as microporous polymer layer are open-celled microporous polypropylene films obtained by stretching a non-porous crystalline elastic polypropylene starting film having an elastic recovery from a 50 percent extension at 25° C. of at least 20 percent, the polypropylene polymer having a melt index in the range of from about 8 to about 30 and a weight average molecular weight of about 100,000 to 240,000, until an open-celled microporous structure is formed in said film and heat setting the resulting stretched film, to stabilize the open-celled structure in the stretched film, Films of this type are described in U.S. Pat. No. 3,839,240, the disclosure of which is incorporated herein by reference.

Still further suitable as microporous polymer layers are open-celled microporous polymer films having a reduced bulk density as compared to the bulk density of the corresponding polymer film having no open-celled structure, a crystallinity of above about 30 percent, a pore size of less than 5000 Å, a nitrogen flux of more than 30, a surface area of at least 30 sq.m/cm$^3$ and a breaking elongation of 50 to 150 percent, said open-celled microporous polymer films being obtainable by cold stretching a non-porous, crystalline, elastic film until porous surface regions perpendicular to the stretch direction are formed, the non-porous elastic film having a crystallinity of above about 20 percent, and an elastic recovery from a 50 percent strain of at least 40 percent at 25° C., hot stretching the resulting cold-stretched film until pore spaces elongate parallel to the stretch direction are formed, and thereafter heating the resulting microporous film under tension. Films of this type are described in U.S. Pat. No. 3,801,404 and 3,679,538, the disclosure of which is incorporated herein by reference.

Also suitable as microporous polymer layer are films having a microporous, open-celled structure, an apparent density no greater than about 90 percent of the density of the polymer comprising the film, said polymer having a crystallinity when solid of at least 40 percent and being selected from the group consisting of polyethylene, polypropylene and polyacetal, and said film being characterized by an open-celled structure comprising pore spaces wherein the size distribution of said pore spaces is optimized in the 1000 to 2000 Å range, said film being obtainable by (a) extruding said polymer at a melt temperature no higher than about 100° C. above the crystalline melting point of said polymer, so as to form a film; (b) taking up the resulting film at a drawdown ratio of from 20:1 to about 180:1; (c) rapidly cooling the extruded film while it is being drawn down; (d) annealing the resulting film at a temperature in the range of about 5 to 100° C. below the crystalline melting point of said polymer for a period of at least 5 seconds in order to develop in the resulting film an elastic recovery from a 50° strain of at least 50 percent at 25° C.; (e) cold drawing the film at a draw ratio of from about 30 percent of about 150 percent of its total length at a temperature no greater than about 200° F. when said film comprises polypropylene, no greater than about 220° F., when said film comprises polyethylene and no greater than about 255° F. when said film comprises polyacetal; (f) heat setting the thus cold drawn film at a temperature of from about 80° C. to about 150° C. while under tension. Films of this type are described in U.S. Pat. No. 3,558,764, the disclosure of which is incorporated herein by reference.

The micropores of the microporous polymer layer(s) have an average pore size of less than 1 $\mu$m in diameter. Preferably more than 50% of the pores are 0.5 $\mu$m or less in diameter. It is especially preferred that at least 90% of the pores have a diameter of less than 0.5 $\mu$m. The micropores preferably have an average pore size within the range of 0.05 to 0.5 $\mu$m, preferably 0.1 to 0.2 $\mu$m.

The holes of the microporous polymer layer preferably have a size of >15 $\mu$m to 3 mm, more preferably 20 $\mu$m to 500 $\mu$m and most preferably 30 to 200 $\mu$m. The holes are generally formed after the microporous polymer layer has been formed, e.g. by punching or pricking holes in the microporous polymer layer. The size and form of the holes is usually determined by the tools used for punching or pricking the holes. For instance, the holes can be angular, such as a triangular, square or rhomboidal, oval, or elliptical in cross-section. Preferably they are round in cross-section and have a cylindrical form. Methods and facilities for forming holes are well known to a person skilled in the art.

The number of the holes can be defined by the percentage of the surface of the microporous polymer layer which is covered by the holes. The surface of one side of the microporous polymer layer is given by the product of the height of the microporous polymer layer multiplied by its width. The area covered by a single circular pore is given by the equation area A=$\pi r^2$ wherein r is the radius of the pore. The total area covered by the holes is obtained adding the areas of all holes. According to a preferred embodiment the holes cover 1 to 60% of the surface of one side of the microporous polymer layer, more preferably 2 to 40%, and most preferably 5 to 20%.

The holes are preferably spaced apart 0.5 to 10 mm, i.e. the minimum distance between two holes is preferably within the range of 0.5 to 10 mm independent of the direction. The holes may be arranged aligned or alternately or randomly distributed.

The holes ensure an efficient oxygen cycle within the battery. Moreover, microporous polymer layers with an average pore size of less than 1 μm and a rather low number of holes show a better resistance to dendrite growth than microporous polymer layers with an average pore size of 1 μm and more, e.g. about 5 μm.

The thickness of the microporous polymer layer is preferably within the range of 0.02 to 0.3 mm, preferably within the range of 0.1 to 0.25 mm and most preferably about 0.2 mm. This thickness refers to the thickness of the base web, i.e. the thickness of the microporous layer without taking into account any ribs or studs which may be present.

The fibrous layer can be made of glass fibers, polymeric fibers or a mixture of glass fibers and polymeric fibers. Suitable mats made of polymer fibers which may be used as fibrous layers in the present invention are disclosed in U.S. Pat. No. 5,962,161, the disclosure of which is incorporated herein by reference.

The preferred material is glass. Generally all glass fiber materials known in the art for producing absorptive glassmat (AGM) separators may be used for forming the fibrous layers of the present invention. A preferred fibrous material are absorptive microfiber glass fleeces without organic components like binder or polymeric fibers. It is preferred that the fibers have a diameter ranging from 0.1 to 10 μm, more preferably from 0.1 to 5 μm. The fibers are preferably blends of acid resistant glass fibers of various diameter, usually extremely thin fibers with an average fiber diameter below 1 μm, referred to as microfibers, and "coarse" fibers with an average diameter of approx. 3 μm. The microfibers increase the internal surface, improve the tensile strength and decrease the pore diameter, but significantly increase the product cost. The larger fibers facilitate—as mentioned above—the battery filling by creating larger pores with faster acid pick-up.

The fibrous glass layers preferably comprise 20 to 40% by weight of glass microfibers having an average diameter of less than 1 μm and 60 to 80% by weight of coarse glass fibers having an average diameter of about 3 μm, for instance 30% by weight microfibers and 70% by weight coarse fibers. Suitable glass fiber mats and the preparation thereof are well known to a person skilled in the art (see for instance B öhnstedt W., in Handbook of Battery Materials, Editor Besenhard J. O., Wiley-VCH, Weinheim 1999, pages 245 to 292 and literature cited therein).

Preferred fibrous layers made of polymer fibers comprise a nonwoven web, mat or fleece of fibers of a diameter of 0.1 to 10 μm, preferably 0.1 to 5 μm. It is preferred that more than 10% by weight of the fibers, more preferably more than 15% by weight of the fibers and most preferably 20 to 40% by weight of the fibers have a diameter smaller than 1 μm, preferably about 0.1 μm, and it is further preferred that at least 60% by weight of the fibers have diameters of less than 5 μm. The fibers are made of a thermoplastic polymer, which is preferably selected from the group consisting of polyolefins, polystyrenes, polyamides, polyesters, halogenated polymers, and the respective copolymers, more preferably polyolefins and in particular polyethylenes and polypropylenes. To render the fibrous layer wettable, a suitable surface active agent is added to the polymer prior to extrusion or hydrophilic groups are covalently bonded to the surface of the fibers after formation. Suitable treatments are described in U.S. Pat. No. 5,962,161, the disclosure of which is incorporated herein by reference. Nonwoven mats of this type can be manufactured by extrusion and blowing processes. One preferred way is described in U.S. Pat. No. 6,114,017, which comprises melting a polymer by polymer heating and extrusion means, extruding said polymer at flow rates of less than 1 g/min/hole through polymer orifices arranged in one or more spaced apart cross directional rows on one or more modular dies heated by a heating unit, wherein the diameters of said orifices may be equal to each other or may differ from row to row to obtain a web comprising fibers of essentially uniform or varying diameter, blowing said polymer extrudate using heated air of at least 95° C. from two or more constant or variable cross-section air jets per polymer orifice, preferably variable cross-section air jets being converging-diverging nozzles capable of producing supersonic drawing velocities, or tempered air between 10° C. and 375° C. of two or more continuous converging-diverging nozzle slots placed adjacent and essentially parallel to said polymer orifice exits to attenuate said filaments and to produce essentially continuous polymer filaments, and depositing said liberized polymer on a collecting means to form a self-bonded web consisting of as many layers of disbursed continuous polymer filaments as the number of rows of said polymer orifices in said die. U.S. Pat. No. 5,679,379 discloses modular die units suitable for the production of the above nonwoven mats. The disclosure of both U.S. Pat. No. 6,114,017 and 5,679,379 is incorporated herein by reference. The self-bonded webs produced in the above process may also be thermally bonded to provide even greater strength by using conventional hot calendering techniques where the calender rolls may pattern engraved or flat. The nonwoven webs, mats or fleeces have low average diameters, improved uniformity, a narrow range of fiber diameters, and significantly higher unbonded strength than a typical meltblown web. When the material is thermally bonded it is similar in strength to spunbonded nonwovens of the same polymer and basis weight.

When a mixture of glass fibers and polymeric fibers is used, the different fibers are preferably used in such proportions that the sheet has an absorbency with respect to the electrolyte of from 75 to 95% in the absence of a surfactant. Preferably the glass and polymeric fibers defined above are used. Fibrous sheets of this type may be prepared by the methods disclosed in U.S. Pat. No. 4,908,282, the disclosure of which is incorporated herein by reference.

The fibrous layer preferably has an average pore size of 3 to 15 μm, more preferably 5 to 12 μm and most preferably 6 to 10 μm.

At a thickness of 0.6 mm at 10 kPa fibrous glass layers typically have a basis weight of 100 g/m$^2$ and a porosity of 93 to 95%. The BET surface area of the fibrous layer is preferably within the range of 0.5 to 2.5 m$^2$/g, more preferably 1.1 to 1.3 m$^2$/g. These and other parameters defined herein are determined according to well established procedures (e.g. BCI Test Methods, BCI/RBSM Standard Test Methods, Battery Council International, Chicago, Ill.; USA; if not stated otherwise the thickness of the fibrous layer always refers to the thickness of the dry layer).

Nonwoven webs of polymer fibers, at a thickness of 0.6 mm at 10 kPa, typically have a basis weight of 70 g/m$^2$ and a porosity of 91 to 95%. The BET surface area of the fibrous layer is preferably within the range of 1 to 5 m$^2$/g, more preferably 2 to 3 m$^2$/g. These parameters are determined as described above (e.g. BCI Test Methods).

At a thickness of 0.6 mm at 10 kPa, fibrous sheets comprising a mixture of 85% a by weight of glass fibers having a thickness of 0.1 to 10 μm and 15% by weight of polymeric fibers having a thickness of 0.1 to 10 μm, typically have a basis weight of 90 to 95 g/m$^2$ and a porosity of 91 to 95%. The BET surface area of the fibrous layer is preferably within the range of 1 to 3 m$^2$/g, more preferably 1.1 to 2.5 m²/g. These parameters are determined as described above (e.g. BCI Test Methods).

The fibrous layer preferably has a thickness of 0.2 to 3.6 mm, more preferably 0.3 to 1.0 mm. The upper limit for the thickness of the fibrous layer is determined by the desired total thickness of the separator. Separators for starter batteries, which are also referred to as SLI (starting-lighting-ignition) batteries, preferably have a total thickness of 0.6 to 1.8 mm, separators for industrial batteries, such as motive power and stationary batteries, of 2 to 4 mm. For the preferred embodiment of the invention (one fibrous layer sandwiched between two microporous polymer layers) the fibrous layer of a separator for starter batteries thus preferably has a thickness of 0.2 to 1.2 mm, more preferably of 0.3 to 1.0 mm. For a industrial battery the thickness of the fibrous layer is preferably within the range of 1.4 to 3.5 mm, more preferably 1.5 to 2.0 mm. Instead of a single fibrous layer having a thickness of e.g. 2 mm two or more adjacent fibrous layers having a total thickness of 2 mm may be used. The thickness is determined at 10 kPa using the BCI method (see above).

The separators of the present invention can be provided in sheet form or in the form of a pocket with an open top, a closed bottom and closed sides. Accordingly it is preferred embodiment that the microporous polymer layers are larger than the fibrous layer. Thus, when combining the microporous polymer layers and the fibrous layer, the fibrous layer does not completely cover the microporous layers. It is preferred that at least two opposing edge regions of the microporous polymer layers remain uncovered to provide edges for heat sealing which facilitates the formation of pockets. In addition, the uncovered edge regions allow full edge ribbon sealing of the separator which is advantageous in the formation of spiral wound cells. The manufacture of pockets as well as spiral wound cells is well known to a person skilled in the art. It was found that the separators of the present invention can be easier formed into pockets than multilayer separators according to the prior art comprising two outer AGM layers.

The separators of the invention can be formed by laminating at least one microporous polymer layer and at least one fibrous layer. The various layers can be bonded together by glueing, ultrasonic sealing or sewing. Preferably an adhesive such as an acrylate or polyethylene hot melt is used to improve bonding between the microporous polymer layer and the fibrous layer. The adhesive is preferably applied between the layers of the separator in form of individual spots or continuous stripes, The manufacture of such laminates is well known to a person skilled in the art.

It is evident that a separator according to the invention can also be prepared in situ, e.g. by individually separating or pocketing the positive and negative electrodes in separators made of a microporous polymer and bringing together the combinations of electrode and microporous polymer separator with fibrous layers during assembly of the battery. Thus, batteries can be formed by a method comprising the steps of pocketing at least one first electrode plate in a pocket made of microporous polymer material, providing the pocketed electrode plate with a fibrous layer wrap, for instance by folding an AGM mat in the middle and placing the pocketed electrode in the folded AGM mat, combining the fibrous layer wrapped pocketed electrode plate with at least one second electrode plate, introducing the combined electrode plates into a suitable case, introducing into the case a suitable quantity of electrolyte, and closing the case. According to a preferred embodiment the second electrode plate is also pocketed in a pocket made of microporous polymer before combining the at least one first and the at least one second electrode plate. The microporous polymer material used for pocketing of the first and optionally also of the second electrode plate comprises micropores with an average pore size of less than 1 µm and a number of holes with a diameter which is greater than the average diameter of the pores of the fibrous layer wrap. The electrode plates are arranged in such a way that the fibrous layers and microporous polymer layers form at least one separator according to the present invention. Usually 4 to 8 fibrous layer wrapped pocketed electrode plates and 4 to 9 of the second electrode plates are combined in one cell and several cells are connected to give a battery.

The separators of the present invention can be prepared at considerably lower costs than separators according to the prior art based on pyrogenic silica or AGM with a large portion of microfibers. In addition, due to their increased tensile strength they can be processed at higher speeds than common and other fibrous layer separators and thus significantly accelerate the manufacture of lead-acid batteries. Besides improved tensile strength the separators of the invention show good oxygen transfer which helps to prevent premature failure of the battery. Moreover, the microporous polymer layered improve the compressive properties of AGM and other fibrous layers and ensures a more uniform compression.

The invention further pertains to a valve-regulated lead-acid battery comprising at least two oppositely charged electrodes in a closed case, a body of an electrolyte and a separator between adjacent ones of said electrodes, wherein said separator is a separator as defined above. The electrolyte is preferably totally absorbed by the separator and the electrode plates.

The invention will be more fully understood from the following examples, which are presented solely for the purpose of illustration, and are not to be construed as limiting.

EXAMPLE 1

A microporous filled UHMW polyethylene membrane having a thickness of 0.2 mm and an average pore size of 0.1 µm (Daramic™ 200 HP; Daramic, Inc.) was laminated to a glass fiber layer. The polyethylene used in this example had an average molecular weight of 7 million, a standard load melt index of 0, and a viscosity number of 3000 ml/g. The polyethylene was filled with 60% by weight of silica. The polyethylene membrane was pricked with 200 µm needles in order to form about 100 holes per cm². The holes had a diameter of 200 µm and were spaced 1 mm apart.

The glass fiber layer was made of about 35% by weight of glass fibers having a thickness of up to 1 µm and about 65% by weight of glass fibers having a thickness of about 3 µm. The fiber layers had a porosity of 95%, an average pore size of 12 µm and a BET surface area of 1.1 m²/g (Hovosorb™ BG 1305; Hollingsworth & Vose Co.).

The glass fiber layer had a thickness of 0.8 mm at 10 kPa. Lamination was achieved by a stripe of adhesive (acrylate glue; Rhoplex™ N-495). The final two-layer separator had a thickness of 1.1 mm (at 10 kPa) and a size of about 130 mm×160 mm.

EXAMPLE 2

A battery separator was produced by the procedure of Example 1, except that two microporous polyethylene membranes were laminated with the glass fiber layer. The glass fiber layer was sandwiched between the polyethylene membranes. The three-layer separator has a thickness at 10 kPa of 1.3 mm.

What is claimed is:

1. A battery separator comprising at least one microporous polymer layer and at least one fibrous layer, wherein said microporous polymer layer comprises micropores with an average pore size of less than 1 µm and a number of holes with a diameter which is greater than the average diameter of the pores of the fibrous layer.

2. A battery separator according to claim 1 comprising at least two microporous polymer layers, wherein the at least one fibrous layer is sandwiched between the at least two microporous polymer layers.

3. A battery separator according to claim 1, wherein the fibrous layer has an average pore size of 3 to 15 µm.

4. A battery separator according to claim 1, wherein the holes of the microporous polymer layer have a size of >15 µm to 3 mm.

5. A battery separator according to claim 1, wherein the holes of the microporous layer cover 1 to 60% of the surface of the microporous layer.

6. A battery separator according to claim 1, wherein the holes are spaced apart 0.5 to 10 mm.

7. A battery separator according to claim 1, wherein the microporous polymer layer is a polyolefin layer.

8. A battery separator according to claim 7, wherein the polyolefin has a molecular weight of at least 600,000, a standard load melt index of substantially 0, and a viscosity number of not less than 600 ml/g.

9. A battery separator according to claim 7, wherein the polyolefin is polyethylene.

10. A battery separator according to claim 1, wherein more than 50% of the micropores of the microporous polymer layer are 0.5 µm or less in diameter.

11. A battery separator according to claim 1 or 2, wherein the microporous polymer layer has a thickness of 0.02 to 0.3 mm.

12. A battery separator according to claim 1, wherein the fibrous layers essentially consist of glass fibers.

13. A battery separator according to claim 12, wherein the fibrous layers comprise 20 to 40% by weight of glass microfibers having an average diameter of less than 1 µm and 60 to 80% by weight of coarse glass fibers having an average diameter of about 3 µm.

14. A battery separator according to claim 1, wherein the fibrous layers essentially consist of polymeric fibers.

15. A battery separator according to claim 14, wherein the fibrous layers comprise polymeric fibers having a diameter of 0.1 to 10 µm.

16. A battery separator according to claim 15, wherein at least 10% by weight of the polymeric fibers of the fibrous layers have diameter of less than 1 µm and at least 60% by weight of the polymeric fibers have diameters of less than 5 µm.

17. A battery separator according to claim 16, wherein at least 15% by weight of the polymeric fibers have diameters of less than 1 µm.

18. A battery separator according to claim 17, wherein the fibrous layers comprise 20 to 40% by weight of polymeric microfibers having an average diameter of less than 1 µm.

19. A battery separator according to claim 15, wherein the polymeric fibers have diameters ranging from 0.1 to 5 µm.

20. A battery separator according to claim 14, wherein the polymeric fibers are polyolefin fibers.

21. A battery separator according to claim 20, wherein the polyolefin is polyethylene and/or polypropylene.

22. A battery separator according to claim 1, wherein the fibrous layers comprise a mixture of glass fibers and polymeric fibers.

23. A battery separator according to claim 22, wherein the fibrous layers comprise glass fibers having a diameter of 0.1 to 10 m.

24. A battery separator according to claim 23, wherein the glass fibers have diameters ranging from 0.1 to 5 µm.

25. A battery separator according to claim 22, wherein the fibrous layers comprise polymeric fibers having a diameter of 0.1 to 10 µm.

26. A battery separator according to claim 25, wherein the polymeric fibers have diameters ranging from 0.1 to 5 m.

27. A battery separator according to claim 22, wherein the polymeric fibers are polyolefin fibers.

28. A battery separator according to claim 27, wherein the polyolefin is polyethylene and/or polypropylene.

29. A battery separator according to claim 1 or 2, wherein the fibrous layers have a thickness of 0.2 mm to 3.6 mm.

30. A battery separator according to claim 1, having the form of a pocket with an open top, a closed bottom and closed sides.

31. A valve-regulated lead-acid battery comprising at least two oppositely charged electrodes in a closed case, a body of an electrolyte and a separator between adjacent ones of said electrodes, wherein said separator is a separator according to claim 1 or 2.

32. A method of producing a lead-acid battery, said method comprising the steps of pocketing at least one first electrode plate in a pocket made of microporous polymer material, providing the pocketed electrode plate with a fibrous layer wrap, combining the pocketed electrode plate wrapped in a fibrous layer with at least one second electrode plate, introducing the combined electrode plates into a suitable case, introducing into the case a suitable quantity of electrolyte, and closing the case, said microporous polymer material comprising micropores with an average pore size of less than 1 µm and a number of holes with a diameter which is greater than the average diameter of the pores of the fibrous layer wrap and said at least one first and said at least one second electrode plate being arranged in such a way that the fibrous layers and microporous polymer layers form at least one separator according to claim 1.

33. A method according to claim 32, wherein the at least one second electrode is pocketed in a pocket made of microporous polymer material comprising micropores with an average pore size of less than 1 µm and a number of holes with a diameter which is greater than the average diameter of the pores of the fibrous layer wrap before combining the at least one first and the at least one second electrode.

34. A method according to claim 32, wherein the fibrous layers are absorptive glassmat layers.

35. A method according to claim 34, wherein the at least one second electrode is pocketed in a pocket made of microporous polymer material comprising micropores with an average pore size of less than 1 µm and a number of holes with a diameter which is greater than the average diameter of the pores of the fibrous layer wrap before combining the at least one first and the at least one second electrode.

* * * * *